United States Patent
Weber et al.

[15] 3,693,330
[45] Sept. 26, 1972

[54] SELF PROPELLED SWEET CORN HARVESTER

[72] Inventors: Wilbert D. Weber, Mississauga; Robert Ashton, Islington, Ontario, both of Canada

[73] Assignee: Massey-Ferguson Industries Limited, Toronto, Ontario, Canada

[22] Filed: Oct. 8, 1971

[21] Appl. No.: 187,677

[52] U.S. Cl. .....................56/12.8, 56/16.5, 56/16.6
[51] Int. Cl. .............................................A01d 45/02
[58] Field of Search............56/12.8, 13.2, 13.3, 14.1, 56/14.6, 16.4–16.6, 51, 103–106; 130/5 D

[56] References Cited

UNITED STATES PATENTS

| | | | |
|---|---|---|---|
| 2,424,181 | 7/1947 | Messenger et al. | 130/5 D |
| 3,448,565 | 6/1969 | Barkstrom et al. | 56/16.5 X |
| 3,462,921 | 8/1969 | Meredith | 56/12.8 X |
| 3,599,404 | 8/1971 | Fernandez | 56/12.8 |
| 3,630,009 | 12/1971 | Ashton | 56/16.6 |

Primary Examiner—Louis G. Mancene
Assistant Examiner—J. N. Eskovitz

[57] ABSTRACT

A self propelled sweet corn harvester with a corn head having multiple snapping units with a pair of snapping rolls and a pair of gathering chains for each snapping unit, a tank for temporary storage of ears of unhusked green corn, a conveyor system to elevate the ears of corn from the corn head to the storage tank, and cleaning means including a fan, a beater, a hood assembly and a panel assembly for removing stalks and other trash from the ears of corn and ejecting the trash from the harvester. The beater is mounted above the storage tank for both vertical and horizontal adjustment. The hood assembly includes an adjustable section for adjusting the size of the passage between the beater and the hood assembly through which stalks and trash are ejected from the machine. The panel assembly includes a panel pivotally attached to the beater supports and movable with the beater and a second panel pivotally attached to the first panel and to the storage tank.

3 Claims, 4 Drawing Figures

INVENTOR.
WILBERT D. WEBER
BY ROBERT ASHTON

ATTORNEYS.

SELF PROPELLED SWEET CORN HARVESTER

This invention relates generally to a corn picker. More specifically the invention relates to a cleaning assembly for a self propelled sweet corn picker for harvesting green sweet corn.

In recent years combine harvester threshers have been adapted to harvest and thresh field corn in one operation by replacing the header unit of standard grain combines with row crop harvesting heads. These row crop harvesting heads have snapping units each of which include a pair of snapping rolls and a pair of gathering chains for each row of corn. Many combines have sufficient capacity to utilize row crop harvesting heads with snapping units for up to eight rows of corn. This development has greatly improved field corn harvesting over prior corn harvesting methods.

Green sweet corn on the other hand is harvested by one and two row corn pickers which are either mounted on a tractor or pulled behind a tractor. With these corn pickers it is necessary to pull a wagon behind the picker to catch the ears of corn conveyed from the picker.

It was discovered that with minor modifications the corn heads used on combines for picking and threshing field corn could pick sweet corn faster, with less loss and with less damage to the ears than the one or two row units mounted on tractors. This increase in the speed of harvesting and decrease in losses is very important to the sweet corn industry in that sweet corn must be harvested and shipped to the cannery within a few hours of the time that it is ready for harvesting. If the moisture content of the corn is not within certain narrow limits when it reaches the cannery, it cannot be used for canning purposes.

It would be desirable, therefore, to have a self propelled sweet corn harvester employing a modified version of the corn heads used on combines and having a storage tank for ears of corn. Unfortunately, a combine is not readily adaptable for harvesting sweet corn. None of the threshing mechanisms of the combine are usable. Also the problems involved with conveying green sweet corn and separating stalks and trash without damaging the ears are considerably different than those encountered with dry field corn.

The sweet corn harvester of this invention includes a frame, drive wheels supporting one end of the frame, at least one steerable wheel supporting the other end of the frame, and operator's platform mounted on the frame, an elevator assembly with its rear end pivotally attached to the frame for pivotal movement about a horizontal axis, a multiple row corn head with snapping units for each row attached to the forward end of the elevator, means to pivot the elevator assembly about said horizontal axis to raise and lower the corn head, a chain and slat type conveyor for receiving material from the elevator assembly and for conveying the material up and to the rear, a cleaning mechanism for separating trash from the ears of corn which fall from the delivery end of the conveyor including a fan, at least one beater spaced horizontally to the rear of the chain and slat type conveyor, adjustable support brackets to support the beater and a panel assembly attached to the adjustable support brackets for deflecting material away from the beater, a tank for temporary storage of the corn which falls from the cleaning mechanism, and means to unload the storage tank.

The features and advantages of the present invention will become apparent to those skilled in the art as the nature of the invention is better understood from the following detailed description particularly when read with reference to the accompanying diagrammatic drawings in which.

Figure 1:
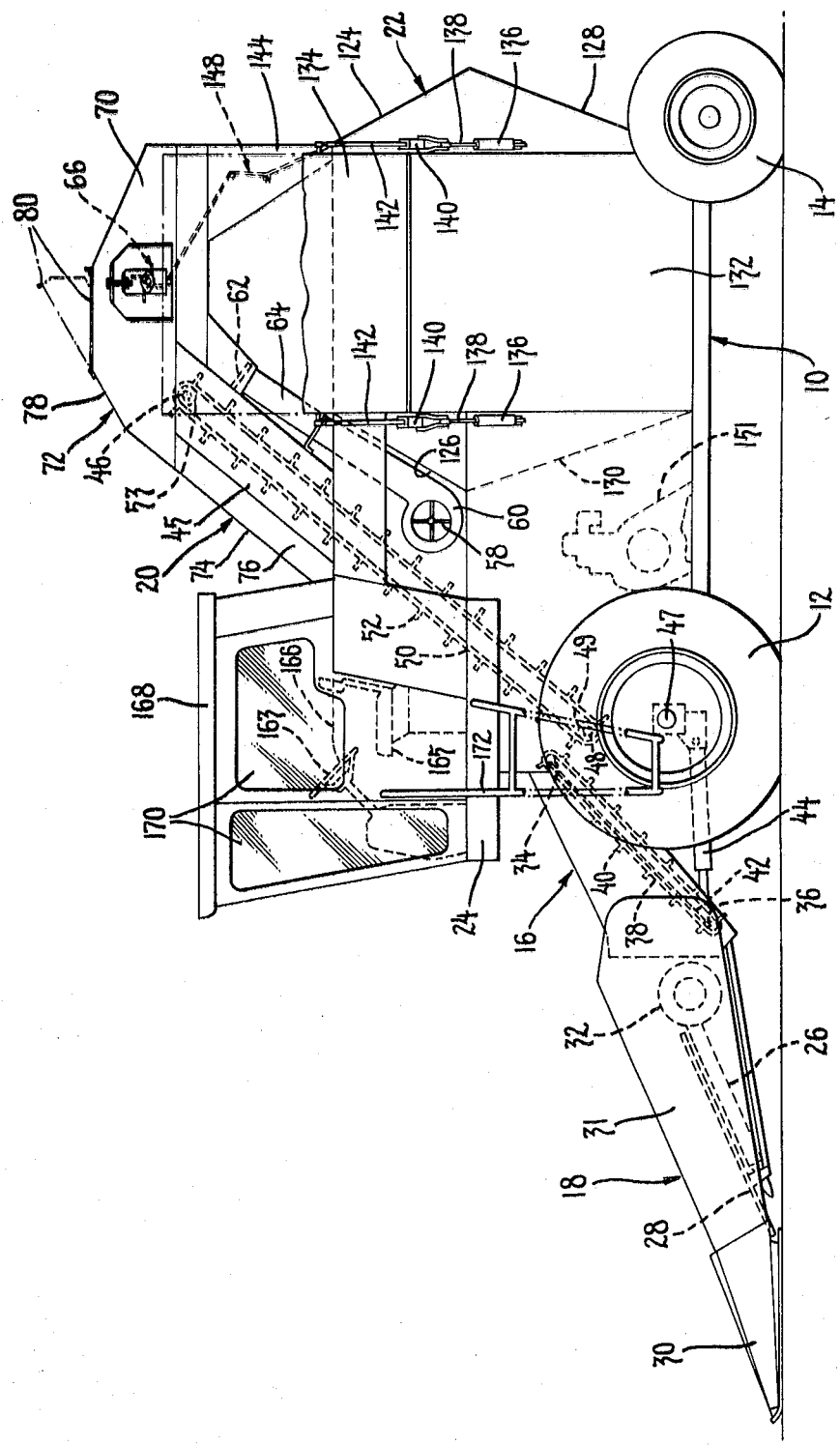
FIG. 1 is a side elevation of a row crop harvester with portions broken away.

The self propelled sweet corn harvester of this invention as shown in FIG. 1 includes a frame 10, supported on drive wheels 12 and steerable wheels 14. An elevator assembly 16 is pivotally attached to the forward portion of the frame 10. A corn head 18 is attached to the elevator assembly 16. A conveyor assembly 20 is provided to convey ears of corn up and into the top of the storage tank 22. An operator's platform 24 is mounted on the forward portion of the frame 10. Cleaning means are provided to separate stalks and trash from the ears of corn before they are deposited in the storage tank 22.

The corn head 18 preferably includes four snapping units, each of which has a pair of snapping rolls 26 and a pair of gathering chains 28. Snout assemblies 30 and dividers 31 are attached to the corn head 18 between each of the snapping units. The snout assemblies 30 and dividers 31 guide the rows of corn into each snapping unit. An auger 32 is mounted on the corn head 18 to the rear of the snapping units for rotation about an axis perpendicular to the direction of travel of the machine. The auger 32 conveys the picked ears of corn received from the snapping units toward the center of the machine and into the elevator assembly 16.

The elevator assembly 16 is pivotally mounted on the forward portion of the frame 10 for pivotal movement about the axis of upper shaft 34, a lower shaft 36 is mounted in the lower forward portion of the elevator assembly 16. A pair of chains 38 connected by slats 40 are entrained about sprockets on the shafts 34 and 36. A pan 42 extends from the upper shaft 34 to the lower shaft 36 and from one side of the elevator assembly 16 to the other side of the elevator assembly between the upper and lower runs of the chains 38. The upper shaft 34 of the elevator assembly 16 is driven in a clockwise direction as shown in FIG. 1. Thus the slats 40 carry ears of corn received from the auger 32 up the pan 42 of the elevator assembly 16. The elevator assembly 16 is pivoted about the axis of upper shaft 34 by two hydraulic cylinders 44 that are attached to the front axle 47 and the lower forward portion of the elevator assembly 16 by pins, to adjust the height of the corn head 18 above the ground. The slats 40 should be approximately four feet long to handle the large quantity of material received from the auger 32 of the corn head 18 if a four-row corn head is used.

A conveyor assembly 20 receives the ears of corn from the elevator assembly 16 and elevates them up and to the rear. The conveyor assembly 20 includes side support members 45, an upper shaft 46, a lower shaft 48, a pair of chains 50 connected by slats 52 entrained around the sprockets 53 on the upper shaft 46 and sprockets 49 on the lower shaft 48. A plate 56 is provided between the upper and lower runs of the chain 50 to support the material elevated by the slats 52. Conveyor assembly 20 should be approximately the same width as the elevator assembly 16 in order to carry the large volume of material received from the elevator assembly 16. The slats 52 connected to the chains 50 satisfactorily carry the material on the plate 56 from the elevator assembly 16 up and to the rear at an angle of from 45° to 50° above horizontal.

As the ears of corn C fall from the upper end of the conveyor assembly 20 into the storage tank 22 they are subjected to a stream of air. The stream of air is created by fan 58 and the fan housing 60 mounted between the storage tank 22 and the conveyor assembly 20. The stream of air passes through a grill 62 at the upper end of a duct 64. The stalks and trash T mixed with the ears of corn are carried up and to the rear by the stream of air passing from the grill 62. A beater 66 is provided to assist the stream of air passing from the grill 62 to carry the stalks and trash up and to the rear of the storage tank 22. The beater 66 is rotatably supported on support members 70. A hood assembly 72 attached to the support members 70 encloses the upper end of the conveyor assembly 20.

Figure 2:
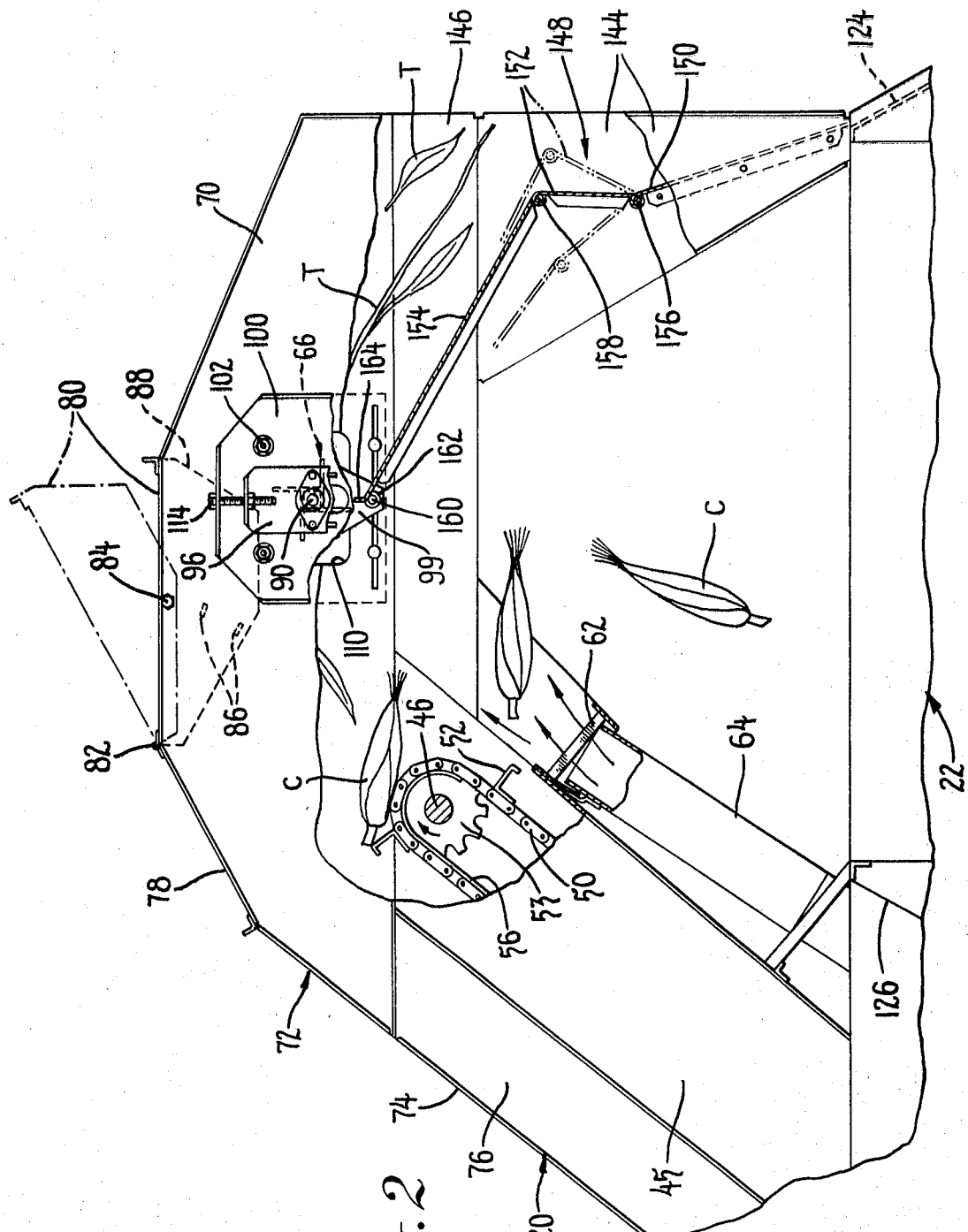
FIG. 2 is an enlarged side elevation of the cleaning mechanism with portions broken away.

The hood assembly 72 includes a cover plate 74 attached to the support members 70 and side extension plates 76 which are attached to the side support members 45 of the conveyor assembly 20. An extension plate 78 is attached to the upper end of the cover plate 74 and to the support members 70. An adjustable wind deflector 80 is connected to the upper end of the extension plate 78 by a hinge 82. By inserting a bolt 84 through a hole in each of the support members 70 and through one of a series of holes 86 in the side sections 88 rigidly attached to each side of the adjustable wind deflector 80, the size of the passage above the beater 66 can be adjusted between the phantom line position and the full line position as shown in FIGS. 1 and 2. The smaller the opening above the beater the greater the velocity of the air from the fan 58 passing over the beater 66.

The velocity of the air passing over the beater 66 is varied to obtain the maximum separation of trash from the ears of corn with given crop conditions. If the trash T is very green and has a high moisture content, the air velocity will have to be high to carry the trash away from the corn. On the other hand, if the trash T is dry a high air velocity will not be required. If there is a large quantity of trash it may be necessary to increase the size of the opening above the beater 66.

The beater 66 includes a beater shaft 90 rotatably supported at each end by a bearing 92. The beater 66 has four paddle members 67 attached to the beater shaft 90. The paddle members 67 are preferably steel plates but could also be a flexible material such as rubber belting if desired. Each of the bearings 92 is held by a pair of bearing flanges 94 which are bolted to a plate 96 by a pair of bolts 98. In addition to holding the bearing flanges 94 on the plates 96, the bolts 98 hold the plates 96 and panel support brackets 99 against the plates 100. The plates 100 are attached to support members 70 by bolts 102.

Figure 3:
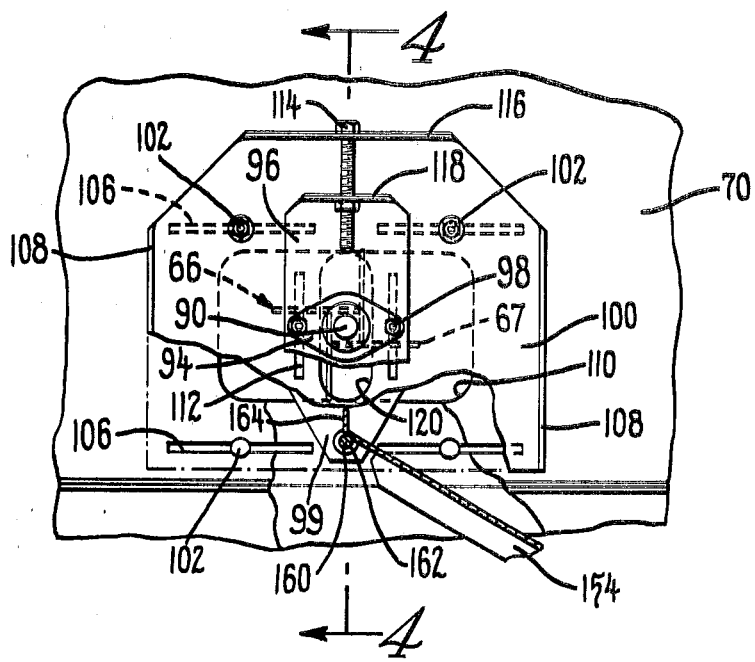
FIG. 3 is an enlarged side elevation of the adjustable beater support brackets with portions broken away.
Figure 4:
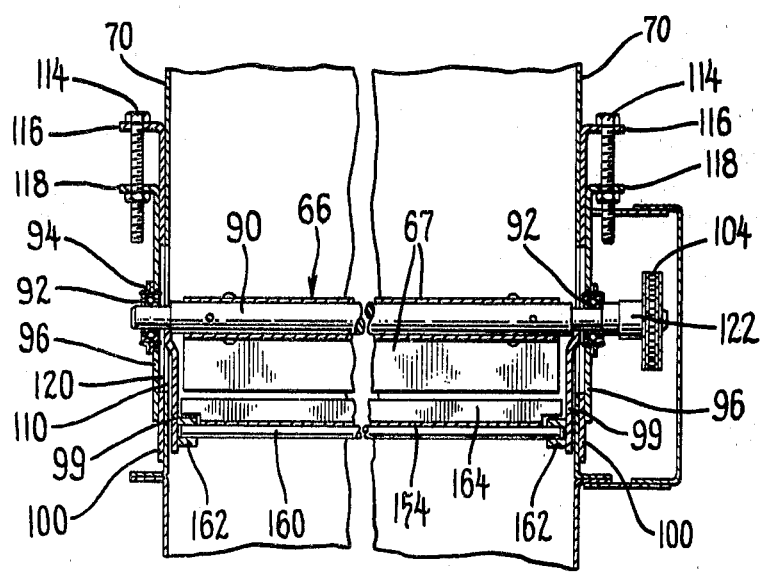
FIG. 4 is a sectional view of the beater taken along lines 4—4 of FIG. 3.

Corn stalks, which are conveyed up the conveyor assembly 20, tend to bridge the gap between the delivery end of the conveyor assembly 20 and the beater 66. Since the beater 66 is driven in a clockwise direction as shown in FIGS. 1, 2 and 3, the stalks which engage the beater are conveyed up and to the rear. Due to variations in the length of the corn stalks conveyed by the conveyor assembly 20 primarily as a result of crop conditions, adjustments are provided for the beater 66 which allow it to be moved horizontally or vertically relative to the conveyor assembly 20 to obtain maximum separation of stalks and trash T regardless of crop conditions. If the ears of corn are small and light the beater 66 may have to be moved away from the conveyor assembly 20 to keep the ears of corn from being blown out. If the trash is moist and heavy it may be necessary to move the beater 66 toward the conveyor assembly 20 to keep the trash out of the storage tank 22.

Horizontal adjustment of the beater 66 is obtained by loosening the bolts 102 in the horizontal slots 106 in the support members 70 and moving the plates 100 relative to the support members 70. A flange 108 is provided on each end of each of the plates 100 to assist in moving the plates 100. After the plates 100 have been moved to the desired position, the bolts 102 are tightened. A large aperture 110 is provided in each of the support members 70 for the beater shaft 90 and the panel support brackets 99.

Vertical adjustment of the beater 66 is obtained by loosening the bolts 98 and the drive chain 104 and sliding the bolts 98 in the vertical slots 112 in the plates 100 by moving the plate 96 relative to the plates 100. Bolts 114, which passes through holes in the flanges 116 on the top of the plates 100 and flanges 118 on the top of the plate 96, are provided to assist in the vertical adjustment of the beater 66. An elongated vertical aperture 120 is provided in each of the plates 100 for the beater shaft 90.

The beater 66 is driven by a drive chain 104 entrained around a sprocket 122 on the beater shaft 90 and a sprocket on the upper shaft 46 of the conveyor assembly 20. The conveyor assembly 20 is driven by a hydraulic motor which is not shown.

The storage tank 22 includes an upper rear wall 124, an upper front wall 126, a lower rear wall 128, a lower front wall 130, and a right hand side wall. The bottom of the storage tank 22 and the biggest portion of the left hand side wall is a chain and slat conveyor 132. During unloading of the storage tank 22, ears of corn from the chain and slat conveyor 132 are deposited on a second tank unloading conveyor 134. The second tank unloading conveyor 134 has one end pivotally attached to the top of the first chain and slat conveyor 132 and a second end which is free.

To deposit ears of corn in a truck or wagon, it is necessary to move the free end of the second tank unloading conveyor 134 up or down in accordance with the height of the truck or wagon which is to receive the ears of corn. The free end of the second tank unloading conveyor 134 is moved up and down by a pair of hydraulic cylinders 136 pivotally attached to the storage tank 22. These hydraulic cylinders 136 include pistons 138 which are pivotally attached to the arms 140. One end of each of the arms 140 is pivotally attached to the storage tank 22. The other end of each of the arms 140 is attached to the second tank unloading conveyor 134 by a pair of connecting rods 142. When the storage tank 22 is not being unloaded, the second tank unloading conveyor 134 can be pivoted until its free end bangs down toward the ground and does not stick out to the side of the machine where it might hang on an obstruction.

A pair of upright support members 144 are attached to the upper rear wall 124 of the storage tank 22. A horizontal support member 146 is attached to the upper edges of each upright support member 144 and the side support members 45 of the conveyor assembly 20. The support member 70 are attached to the horizontal support members 146.

A panel assembly 148 extends from the upper rear wall 124 of the storage tank 22 to a point just below the beater 66 and from the upright support member 144, the horizontal support member 146 and the support member 70 on one side of the harvester to the upright support member 144, the horizontal support member 146 and the support member 70 on the other side of the harvester. The panel assembly 148 includes panels 150, 152 and 154. Panel 150 is rigidly attached to the upper rear wall 124 and the upright support members 144. The panel member 152 is pivotally attached to the panel member 150 by a pin 156. The panel member 154 is pivotally attached, at its rear edge, to an edge of the panel 152 by a pin 158. The forward edge of the panel 154 is supported by a shaft 160 which passes through panel support brackets 99 bolted to the plates 96, and through member 162 on the panel 154. A flange 164 on the panel 154 prevents material from wrapping around the beater 66. Each of the panels 150, 152 and 154 have flanges on their free edges for added strength. When the beater 66 is moved relative to the conveyor assembly 20, the panel members 152 and 154 move with the beater 66 to new positions as indicated by the phantom lines in FIG. 2.

The power unit for propelling the machine and driving the various assemblies includes a liquid cooled internal combustion engine 151 mounted on the frame 10 to the rear of the front axle 47 and below the fan 58. Power is transmitted from the engine to the drive wheels by a hydrostatic drive which is not shown in the drawings. It has been found to be advantageous to drive the elevator assembly 16, the conveyor assembly 20, the fan 58, the chain and slat conveyor 132, and the second tank unloading conveyors 134 by hydraulic motors. The hydraulic motors are driven by a pump which is driven by the internal combustion engine 151. The hydraulic motors provide a cushioning effect which prevents damage to the chains and cross slats when ears of corn catch on various parts of the conveyors.

The operator's platform 24 as shown in FIG. 1 includes a steering wheel 163, a seat 165 and a control console 166. A cab 168 with windows 170 may be provided to protect the operator if desired. A ladder 172 is attached to the operator's platform 24 to assist the operator in climbing up to the platform. The steerable wheels 14 are operatively connected to the steering wheel 163 by a hydrostatic steering system and a tie rod assembly. The steerable wheel 14 are mounted on a long axle that is pivotally attached to a horizontal pin in the center of the rear end of the frame 10. The wheels 14 are spaced from the frame 10 a distance sufficient to allow the wheels 14 to be turned sharply without contacting the frame 10.

In operation, the machine is propelled through the field by the drive wheels 12. A row of corn enters each snapping unit of the corn header where the ears are snapped from the stalks by the snapping rolls 26 and are conveyed by the gathering chains 28 to the auger 32. The auger 32 gathers the ears of corn from all the snapping units and conveys them to the elevator assembly 16. The slats 40 for the conveyor in the elevator assembly 16 carry the ears of corn up the pan 42 and drops the ears onto the conveyor assembly 20. The conveyor assembly 20 includes a conveyor with slats 52 that carry the ears of corn from the elevator assembly 16 up and to the rear. As the ears of corn drop off the upper end of the conveyor assembly 20, they fall into a stream of air passing up through the grill 62. This stream of air blows corn stalks and other trash T mixed with the ears of corn up and to the rear.

With the assistance of the hood assembly 72 and the beater 66, the stalks and other trash separated from the ears of corn C by the stream of air from the fan 58 and the stalks which bridge the space between the conveyor assembly 20 and the beater 66 are deposited on top of the panel assembly 148, or are blown to the rear over the panel assembly 148. The stalks and other material deposited on the panel assembly 148 slide down the panels 154, 152, 150 and the upper rear wall 124 and drop to the ground behind the machine. The ears of corn C, which are heavier than the stalks and other material separated by the air from the grill 62 with the assistance of the beater 66 and the hood assembly 72, fall into the storage tank 22. When the storage tank 22 is filled the second tank unloading conveyor 134 is raised so that the outer free end is above the sides of a truck which is to receive the ears of corn. The truck is moved to a position beside the harvester and the tank unloading conveyors are put into operation to empty the storage tank. The truck then carries the ears of corn to a cannery for further processing and canning.

I claim:

1. An improved self propelled corn harvester including a frame, drive wheels supporting one end of the frame, at least one steerable wheel supporting the other end of the frame, an operator's platform mounted on the frame, a corn head carried by the forward portion of the frame, power means to raise and lower the corn head, a storage tank for temporary storage of ears of corn, a storage tank unloader, a conveyor assembly for conveying ears of corn from the multiple row corn head to the top of the storage tank and cleaning means for separating stalks and trash from the ears of corn characterized by a driven horizontal beater spaced to the rear of the conveyor assembly, a beater support, a hood assembly above the delivery end of the conveyor assembly and the beater, fan means to move a stream of air up between the conveyor assembly and the beater and over the top of the beater between the hood assembly and the beater, drive means to rotate the beater to convey corn stalks which bridge the gap between the conveyor assembly and the beater up and to the rear and to convey trash separated from the ears of corn by the stream of air from the fan means up and to the rear, adjustment means to horizontally and vertically vary the position of the beater support and the beater relative to the conveyor assembly, and a panel assembly pivotally attached to the beater supports to carry material away from the beater.

2. The improved self propelled corn harvester of claim 1 characterized by the panel assembly including a first panel pivotally attached to the beater supports and a second panel pivotally attached to the first panel and to the storage tank.

3. The improved self propelled corn harvester of claim 1 characterized by the hood assembly including an adjustable section to adjust the size of the passage between the beater and the hood assembly.

* * * * *